Patented Feb. 14, 1939

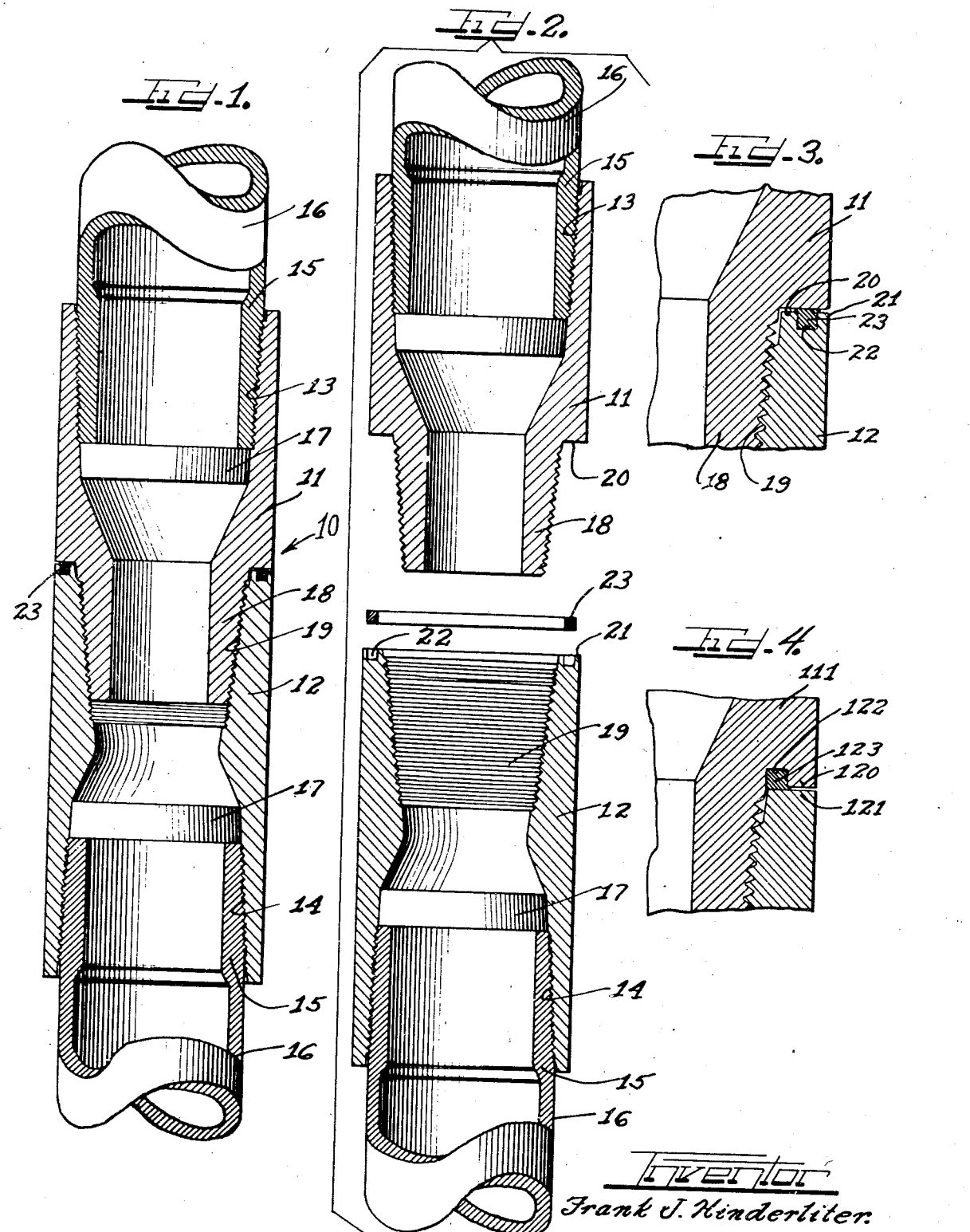

2,147,254

UNITED STATES PATENT OFFICE 2,147,254

ROTARY TOOL JOINT

Frank J. Hinderliter, Tulsa, Okla.

Application July 15, 1935, Serial No. 31,326

1 Claim. (Cl. 285—157)

This invention relates to a tool joint and more particularly to a rotary tool joint for use with drill pipes of the character disclosed in my Patent Re. No. 19,196 granted June 5, 1934.

An object of this invention is to provide a novel way of establishing a seal between the box and pin members of a rotary tool joint.

Another object of this invention resides in the provision of an improved sealing means for use with a rotary tool joint of the type disclosed in my aforesaid patent.

In accordance with the general features of this invention there is provided a rotary tool joint including a box having a threaded socket in which is disposed the threaded shank of a pin the pin and box having engaging shoulders between which is disposed sealing means comprising a ring of resilient material adapted to be tightly pressed between said shoulders by the screwing of the shank into the socket.

In accordance with one form of my invention the sealing means is disposed in a groove in the shoulder of the box member.

In accordance with another form of my invention the sealing means is disposed in an annular groove in the shoulder of the pin member of the joint.

Other objects and features of this invention will more fully appear from the following detail description taken in connection with the accompanying drawing which illustrates a single embodiment thereof.

Figure 1 is a fragmentary sectional view taken through a tool joint embodying my invention, showing the joint applied to the ends of drill pipes.

Figure 2 is a sectional view similar to Figure 1, showing the pin and box members separated with the rubber ring out of the socket.

Figure 3 is an enlarged fragmentary sectional view corresponding to a portion of Figure 1.

Figure 4 is a sectional view similar to Figure 3 illustrating a modification in which the rubber ring is in a groove in the shoulder of the pin member.

The reference numeral 10 designates generally a rotary tool joint of the type disclosed in my aforesaid patent which joint includes a pin member 11 and a cooperable box member 12. Each of these members has a threaded socket 13—14 at its outer end into which is screwed the upset end 15 of a standard drill pipe 16. Positioned in the bottom of each socket 13—14 is a rubber sealing ring 17 of the structure and characteristics of the ring disclosed and claimed in my aforesaid Patent Re. No. 19,196.

The pin member 11 has a tapered threaded shank 18 adapted to be screwed into a tapered threaded socket 19 in the box member 12.

The threaded shank 18 terminates at one end in an annular shoulder 20 which is adapted to engage a shoulder 21 on the box member at the outer end of the socket 19.

In accordance with one form of my invention the shoulder 21 has formed in it an annular groove 22 which is adapted to receive and constitutes the seat for a rubber sealing ring 23. The rubber sealing ring 23 is of such a size that it may be flexed or snapped into the groove 22 but has a cross-sectional area which is greater than the cross-sectional area of the groove 22 so that it projects beyond the groove.

As a result of the rubber ring extending out of the groove 22 it is, when subjected to the pressure of the shoulder 20 on the pin member 11 displaced laterally as shown in Figure 3. In other words, the portion of the rubber ring above the groove 22 is flattened out by the inserting thrust of the pin member 11 into tight sealing engagement with both of the shoulders 20 and 21.

In Figure 4 is illustrated a modification in which the shoulder 120 of the pin member 111 is provided with an annular groove 122 instead of the shoulder 121 of the box member 112. Positioned in this annular groove 122 is a rubber sealing ring 123 similar to the ring 23. With this exception this form of the invention is the same as the previously described one.

In the assembly of the joint the two members are first screwed on the upset ends of the pipes 16. Then a rubber packing or sealing ring 23 is inserted or flexed in the groove of the shoulder of one of these members so that it is tightly seated therein. Thereafter the shank of the pin member is threaded into the socket until the shoulders of the two members are engaged as a result of which connecting operation the projecting portion of the rubber ring is subjected to inserting thrust of the pin member and is thereby pressed into tight sealing engagement with the shoulders of these members.

This sealing means constitutes an effective barrier to escape of any mud-laden fluid from between the threaded shank and socket of the joint members.

Now, I desire it understood that while I have illustrated and described in detail several forms of the invention, the invention is not to be thus limited, but only insofar as defined by the scope and spirit of the appended claim.

I claim as my invention:

A rotary tool joint including a box member having a threaded tapered socket, a pin member having a threaded tapered shank adapted to be screwed into said socket, said socket having an outer lip forming a laterally extending shoulder, said pin member having a laterally extending shoulder adjacent the base of said threaded shank for complementary abutting engagement with said shoulder of said socket, and sealing means between said shoulders comprising a ring of resilient material disposed in an annular groove in one of said shoulders, said ring having a portion projecting from said groove which is adapted to be extruded laterally into sealing position between said complementary shoulders by the screwing of said pin member into said box member, said sealing means in the sealing position having a substantially T-shaped cross-sectional configuration, and the taper of said socket and shank serving to limit the movement of said shank into said socket independently of said shoulders.

FRANK J. HINDERLITER.